Figure 1:
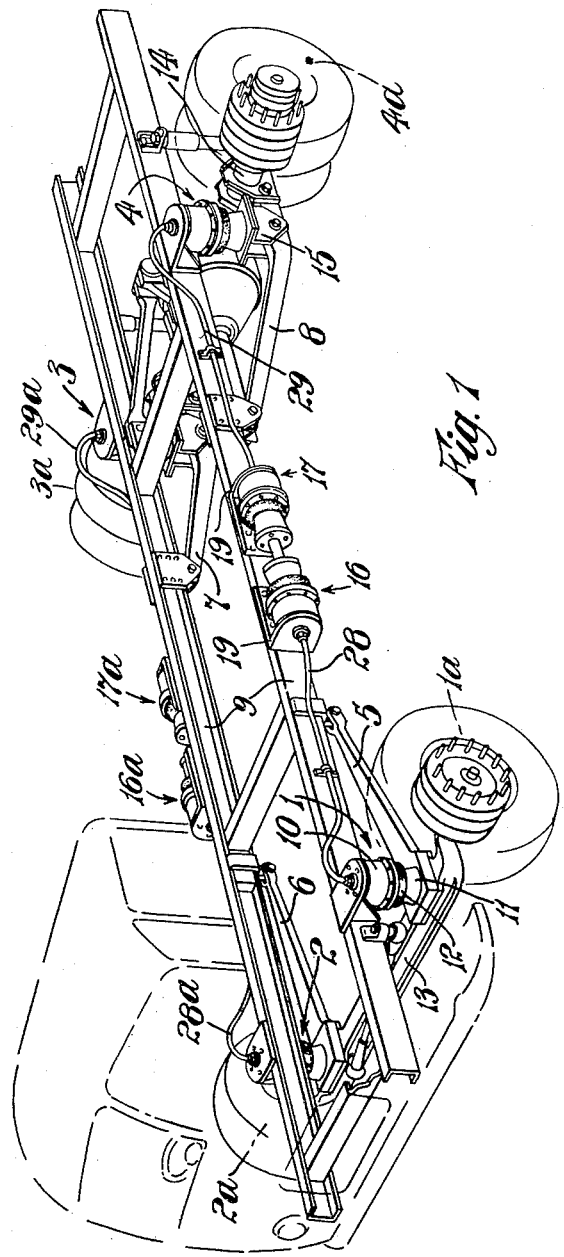

March 13, 1962 R. J. DAVIES ET AL 3,025,076
PRESSURE COMPENSATING SYSTEM AND DEVICE FOR
PNEUMATIC SPRINGS FOR VEHICLES
Filed Feb. 10, 1959 2 Sheets-Sheet 1

INVENTORS
Raymond John Davies
John Turnbull
by Benj. T. Rauber
their attorney

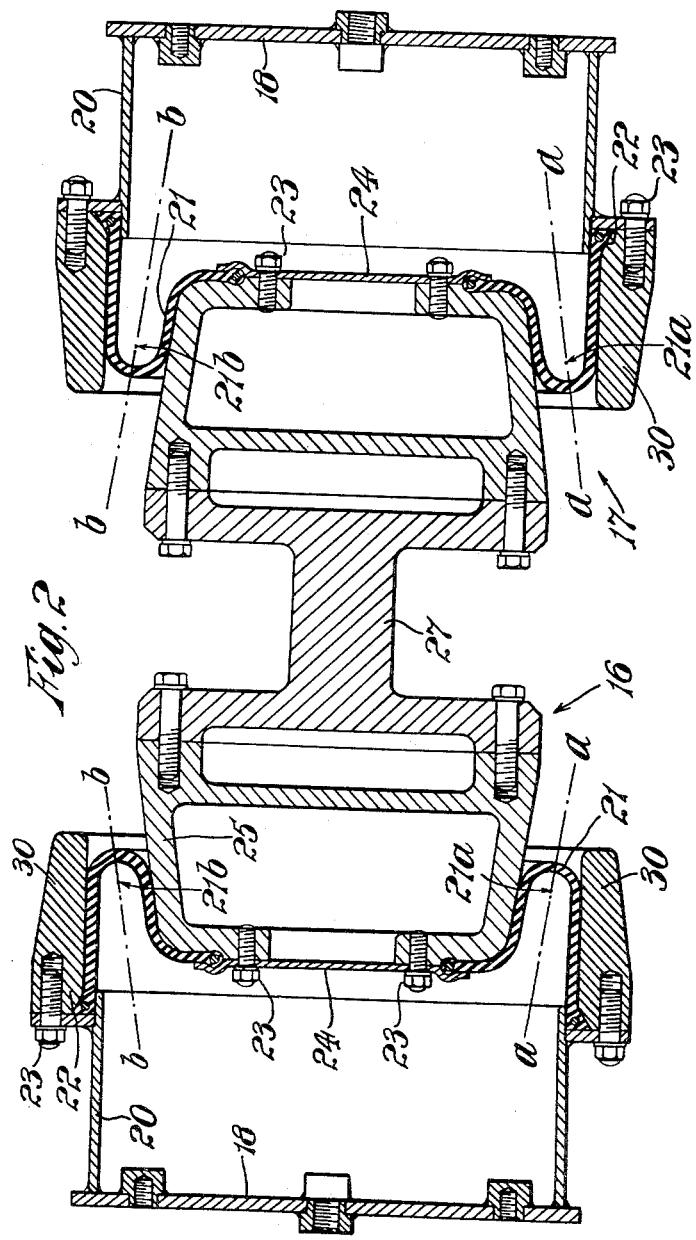

United States Patent Office 3,025,076
Patented Mar. 13, 1962

3,025,076
PRESSURE COMPENSATING SYSTEM AND DEVICE FOR PNEUMATIC SPRINGS FOR VEHICLES
Raymond John Davies, Coventry, and John Turnbull, Tile Hill, Coventry, England, assignors to Dunlop Rubber Company Limited, London England, a British company
Filed Feb. 10, 1959, Ser. No. 792,328
Claims priority, application Great Britain Feb. 15, 1958
5 Claims. (Cl. 280—104)

This invention relates to vehicle suspension systems of the kind comprising fluid springs, and also to devices for use in such systems.

It is known that vehicles provided with fluid suspension systems tend to pitch about a transverse axis due to the front and rear wheels of the vehicle successively striking road irregularities, and it is also known that this pitching can be minimised by connecting the interiors of the front and rear fluid springs on each side of the vehicle by pipes, whereby any increase in pressure in a front spring, caused by the wheel associated with that spring riding over an obstacle, is communicated to the rear spring on the same side of the vehicle so that the side of the chassis or body tends to rise as a whole instead of pitching.

The principal objects of the present invention are to provide a suspension system of the kind referred to in which pitching is minimised or prevented, and to provide a pressure variation transmitting device for use in a system of the kind referred to.

According to the said invention, a suspension system for vehicle having a fluid spring associated with each road wheel comprises means to connect the interior of each spring to a pressure-transmitting device so that a pressure increase in one of said springs increases the pressure in the other spring on the same side of the vehicle.

Preferably said device comprises a pair of intermediate fluid springs mechanically coupled together and having variable effective areas. For example, each intermediate spring may comprise a rolling lobe type spring having a plunger shaped to vary the effective area of the diaphragm in accordance with linear movement of the plunger, and the plunger of one such spring being coupled to the plunger of the other of the pair of springs, the interiors of the two springs being connected to front and rear wheel springs, on the same side of the vehicle, respectively. The arrangement may be such that an increase in pressure in one wheel spring increases the effective area of the intermediate spring connected thereto, and this in turn decreases the effective area of the other intermediate spring which is coupled thereto and increases the pressure therein and hence in the other wheel spring on the same side of the vehicle.

The invention also consists in a suspension system for a vehicle having a fluid spring associated with each road wheel, a pressure transmitting device comprising a pair of rolling lobe type springs having variable effective areas coupled together on each side of the vehicle, and means to connect the interior of each road wheel with a respective one of the intermediate springs on the same side of the vehicle, so that a pressure increase in one wheel spring causes an increase in effective area in the respective intermediate spring and a decrease in effective area of the coupled intermediate spring, and increases the pressure in the other wheel spring on the same side of the vehicle.

From another aspect the invention consists in a pressure transmitting device comprising a pair of rolling lobe type springs having variable effective areas and coupled plungers, so that movement of one plunger accompanied by increase in effective area of that spring causes a corresponding movement of the other plunger and decrease in effective area of the other spring.

The term "road wheel" used herein is intended to include either a single wheel or a group of wheels which are located so close to one another as to act as a single wheel when moving over road irregularities: for example a six wheeled vehicle having a front axle provided with a wheel at each end thereof and a rear axle provided with twin wheels at each end thereof, may have a suspension system according to this invention, with two fluid springs associated respectively with opposite ends of the front axle and two associated respectively with opposite ends of the rear axle.

Furthermore, each road wheel may be associated with a group of fluid springs which intercommunicate and are all in communication with a single intermediate spring.

In order that the invention may be better understood and carried into practice, reference will now be made to the accompanying drawing, wherein:

FIGURE 1 is a perspective view of a vehicle, with parts omitted for clarity; and FIGURE 2 is a sectional elevation on an enlarged scale of a pressure transmitting device forming part of the vehicle suspension system shown in FIGURE 1.

The vehicle shown in the FIGURE 1 is provided with a fluid suspension system comprising four fluid springs 1, 2, 3, 4 respectively, each associated with a corresponding wheel or wheels 1a, 2a, 3a, 4a and each interposed between a radius arm 5, 6, 7, 8 respectively and a side member 9 of the chassis.

Each spring is of the rolling lobe type and comprises a cup-shaped container 10 secured to the chassis, a plunger 11 secured to the radius arm, and an annular flexible diaphragm 12 secured at its outer periphery to the wall of the container, and at its inner periphery to the plunger.

The front radius arms 5, 6 are secured to the front axle 13 at their leading ends, and pivoted to the chassis at their trailing ends, and the rear radius arms 7, 8, are pivoted to the chassis at their leading ends and to the rear axle 14 at their trailing ends. The rear fluid springs are mounted on sub-frames 15 pivotally secured to the rear radius arms adjacent the axle.

Located on one side of the chassis or frame and between the wheels, is a pressure-transmitting device comprising a pair of rolling lobe type intermediate springs 16, 17, see FIGURE 2, which are axially aligned and each of which has a base plate 18, secured to one limb of an L shaped bracket 19 (FIGURE 1) so as to locate the spring within the bracket.

Each base plate is secured to a cylinder 20, so that the plate and cylinder comprise a cup-shaped container. A flexible annular diaphragm 21 is secured at its outer periphery to the rim of each container by a retaining ring 22 and associated studs and nuts 23.

The inner periphery of each diaphragm is secured, by means of a plate 24 and further studs and nuts 23, to a plunger 25, which is frusto-conical in shape.

The plungers are located base-to-base and are mechanically coupled by a member 27, and the interior of each spring 16, 17, is connected by a corresponding pipe 28, 29 (FIGURE 1) to a corresponding wheel spring 1 or 4, the interiors of the springs and pipes being charged with pressure fluid.

The opposite side of the chassis or frame is similarly provided with a pressure-transmitting device comprising a pair of intermediate springs 16a, 17, connected by pipe lines 28a, 29a with the fluid springs 2, 3, and the interiors thereof are similarly charged.

Referring now particularly to FIGURE 2, it will be noted that the diaphragm retaining rings 22 are extended to form guides 30, and the inner surfaces of the guides are cylindrical.

The lobe of each diaphragm lies between the guide and the plunger of the corresponding spring and the centre of curvature of the lobe at any point on the circumference of the lobe always lies substantially on a line which is inclined to the axis of the plunger. Said lines are shown in the drawing for two diametrically opposed points on the circumference of each diaphragm as a—a and b—b.

The mean effective area of each diaphragm is substantially proportional to the square of the mean effective diameter, that is, to the distance between the centres of curvature which lie on the said lines a—a, b—b. In the position shown in the drawing, the said centres, represented by the points 21a, 21b of both springs are equally spaced, so that said effective areas are equal.

Movement of the coupling member in either direction increases the effective area of one diaphragm as the lobe of that diaphragm rolls along the guide away from the adjacent container and increases the spacing between points 21a, 21b. This movement has the opposite effect on the other diaphragm of which the lobe rolls towards the adjacent container and decreases in effective area.

Because the said lines lie on the surface of a cone the variation in effective area will be a function of the linear movement of the plungers.

It will be seen that an increase in pressure in, for example, spring 16 will move the plunger of that spring away from the container and increase the area of the diaphragm, and this movement will displace the plunger of spring 17 into its container and simultaneously decrease the area of the diaphragm of spring 17.

When the vehicle is at rest and unloaded the system on each side of the vehicle will be in equilibrium, the pressure in the front spring 1 or 2 multiplied by the effective area of the corresponding intermediate spring being equal to the pressure in the rear spring 3 or 4 multiplied by the effective area of the intermediate spring associated therewith.

The system operates as follows. Assuming the vehicle to be loaded and in motion, a road irregularity i.e., a bump or obstruction will first force the front wheel 1a or 2a upwardly and the plunger of the front spring 1 or 2 will move inwardly of the container 10 to increase the pressure in the spring and in the intermediate spring communicating therewith. The front of the vehicle will then tend to rise, but at the same time the intermediate spring associated with the front spring which is equally pressurized, will have its effective area increased and its plunger displaced. This displacement, acting through the coupling member displaces the plunger and decreases the effective area of the intermediate spring coupled thereto, and hence increases the pressure in the rear spring 3 or 4 until the rear spring pressure multiplied by the effective area of the intermediate spring associated therewith, equals the front spring pressure multiplied by the effective area of its associated intermediate spring. The rear wheel is on the ground, not yet having encountered the road irregularity, so that the increased pressure in the rear spring forces the rear of the vehicle upwardly, in sympathy with the upward movement of the front of the vehicle caused by the front wheel striking the road irregularity. Thus the whole of the vehicle will tend to move upwardly, maintaining a level condition, and pitching of the vehicle is reduced. The same effect is obtained when the rear wheel strikes the obstruction whilst if the wheels encounter a depression in the road the vehicle will likewise tend to move downwardly in a level condition.

It will thus be seen that because of the pressure-transmitting devices each wheel spring acts through the entire fluid system on the corresponding side of the vehicle, thus providing a low spring rate and corresponding soft single wheel movement, although the front and rear springs may be charged at different pressures. When the vehicle rolls, however, both springs on each side of the vehicle are actuated in unison and both to substantially the same degree. Taking the springs which are compressed by the roll, for example 1 and 4, the plungers 11 move inwardly of the containers 10 substantially the same amount to compress the fluid in the springs and in the intermediate springs associated therewith. Both of the latter are pressurized substantially simultaneously and there is little relative movement between the two. Consequently the plungers do not move to any appreciable extent and the pressure increases are not transmitted, thereby increasing the rate of each spring and resisting the rolling motion.

Having now described our invention, what we claim is:

1. Pressure transducing means for fluid pressure vehicle suspension which comprises a pair of opposed pressure fluid containers spaced from each other and having enclosing walls co-axially arranged with opposed open ends, a floating member having at its opposite ends a plunger, each end of said plunger telescoping into the enclosing wall of one of said opposed containers with a wall co-axially spaced from said enclosing wall, and a flexible, rolling lobe diaphragm for each container spanning and closing the annular space between said co-axial wall of its container and plunger and having surfaces lying against said walls, the surface of at least one of said walls at each telescoping part of the container and plunger being tapered toward the interior of its container so that movement of said floating member into its container reduces the effective area of its diaphragm and plunger.

2. The transducer of claim 1 in which the enclosing wall of each container is cylindrical and in which each co-axial wall of said floating member is tapered toward the end projecting into said container.

3. A suspension system for a vehicle having a fluid spring for each road wheel, means for transmitting fluid pressure from one wheel spring to another, said means comprising a pair of opposed pressure fluid containers spaced from each other and having enclosing walls co-axially arranged with opposed open ends, a floating member having ends telescoping into the enclosing walls of said containers and spaced from said enclosing walls, to form an annular space between the opposed surfaces of each said enclosing wall and the surface of the floating member telescoping thereinto, at least one of said surfaces being tapered to decrease the space between said surfaces prorgressively toward the open ends of said containers, a flexible, rolling lobe diaphragm for each container spanning and closing the annular space between the co-axial wall of each container and the end of the floating member telescoped therein and having surfaces supported by the opposed surfaces of said enclosing wall and said floating member, the interior of one of said containers being connected to the spring of one wheel and the other container being connected to the spring of the other wheel so that pressure from one spring presses its diaphragm toward the other container.

4. A suspension system for a vehicle having a fluid spring for each road wheel, a pair of containers having co-axial enclosing walls of circular cross section spaced co-axially, conduits connecting said containers to the springs on one side of said vehicle to supply pressure fluid from the spring of one wheel to one container and from the spring of the other wheel to the other container, a floating member between the open ends of said containers and projecting into said containers with the surfaces of said projecting ends spaced from the inner surfaces of said containers and a rolling lobe type diaphragm secured to the surfaces of said container walls and floating members and supported by said surfaces and spanning and closing the space between said supporting surfaces at least one of said opposed surfaces being tapered to vary the effective area of said diaphragm attached thereto and exposed to fluid pressure in its container.

5. The suspension system of claim 4 in which said containers are cylinders and said floating member has a tapered wall at each end projecting into an opposed cylinder.

References Cited in the file of this patent

UNITED STATES PATENTS

| | | |
|---|---|---|
| 2,023,135 | Hawkins | Dec. 3, 1935 |
| 2,773,686 | Nash | Dec. 11, 1956 |
| 2,846,983 | Otto | Aug. 12, 1958 |
| 2,973,968 | Behles | Mar. 7, 1961 |

FOREIGN PATENTS

| | | |
|---|---|---|
| B32287 | Germany | May 17, 1956 |
| 1,158,526 | France | Jan. 27, 1958 |